United States Patent
Yu et al.

(10) Patent No.: US 12,199,867 B2
(45) Date of Patent: Jan. 14, 2025

(54) METHOD AND APPARATUS FOR PROCESSING DETNET DATA PACKET

(71) Applicant: ZTE Corporation, Shenzhen (CN)

(72) Inventors: Jinghai Yu, Shenzhen (CN); Chenqiang Gao, Shenzhen (CN); Lifeng Rong, Shenzhen (CN); Aihua Liu, Shenzhen (CN); Quan Xiong, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/769,025

(22) PCT Filed: Oct. 19, 2020

(86) PCT No.: PCT/CN2020/121947
§ 371 (c)(1),
(2) Date: Apr. 14, 2022

(87) PCT Pub. No.: WO2021/088629
PCT Pub. Date: May 14, 2021

(65) Prior Publication Data
US 2024/0106751 A1    Mar. 28, 2024

(30) Foreign Application Priority Data
Nov. 5, 2019 (CN) .......................... 201911072282.5

(51) Int. Cl.
*H04L 45/74* (2022.01)
*H04L 45/50* (2022.01)
*H04L 47/34* (2022.01)

(52) U.S. Cl.
CPC .............. *H04L 45/74* (2013.01); *H04L 45/50* (2013.01); *H04L 47/34* (2013.01)

(58) Field of Classification Search
CPC ......... H04L 45/74; H04L 45/50; H04L 47/34; H04L 45/02
See application file for complete search history.

(56) References Cited

U.S. PATENT DOCUMENTS

2013/0336315 A1* 12/2013 Guichard ................ H04L 45/50
370/389
2021/0226889 A1* 7/2021 Geng ...................... H04L 45/34
(Continued)

FOREIGN PATENT DOCUMENTS

| CN | 109561021 A | 4/2019 |
| CN | 110224934 A | 9/2019 |

(Continued)

OTHER PUBLICATIONS

European Search Report for corresponding application EP20884778; Report dated Oct. 18, 2022.

(Continued)

*Primary Examiner* — Donald L Mills
(74) *Attorney, Agent, or Firm* — CANTOR COLBURN LLP (57) ABSTRACT

Provided are a method and apparatus for processing a deterministic networking (DetNet) data packet. The method includes: performing, by a DetNet node, format encapsulation on a data packet of a DetNet application flow when the DetNet application flow passes through a multiprotocol label switching (MPLS) network, wherein an encapsulated data packet comprises a label indication and a flow identifier header; and forwarding the encapsulated data packet in the MPLS network.

16 Claims, 9 Drawing Sheets

(56) References Cited

U.S. PATENT DOCUMENTS

| | | | |
|---|---|---|---|
| 2021/0243107 A1* | 8/2021 | Retana | H04L 45/34 |
| 2022/0078114 A1* | 3/2022 | Peng | H04L 47/24 |

FOREIGN PATENT DOCUMENTS

| | | |
|---|---|---|
| CN | 110324242 A | 10/2019 |
| WO | 2019057199 A1 | 3/2019 |
| WO | 2019205756 A1 | 10/2019 |

OTHER PUBLICATIONS

Varga B., "DetNet Data Plane: MPLS draft-ietf-detnet-mpls-02.txt", Oct. 16, 2019, pp. 1-30, XP015135582.

International Search Report for corresponding application PCT/CN2020/121947 filed Oct. 19, 2020; Mail date Jan. 25, 2021.

J. Korhonen, Ed, "DetNet MPLS Data Plane Encapsulation draft-ietf-detnet-dp-sol-mpls-00", Jun. 30, 2018, URL: https://datatracker.ietf.org/doc/html/draft-ietf-detnet-dp-sol-mpls-00.

S. Bryant, "Operation of Deterministic Networks over MPLS draft-bryant-detnet-mpls-dp-00", Mar. 5, 2018; URL: https://datatracker.ietf.org/doc/html/draft-bryant-detnet-mpls-dp-00.

* cited by examiner

Perform, by a DetNet node, format encapsulation on a data packet of a DetNet application flow when the DetNet application flow passes through a MPLS network, where an encapsulated data packet includes a label indication and a flow identifier header  — S302

Forward the encapsulated data packet in the MPLS network — S304

Fig. 4(a)

Label indication
FlowID header
Sequence number

Fig. 4(b)

Label indication

FlowID header
Sequence number

METHOD AND APPARATUS FOR PROCESSING DETNET DATA PACKET

CROSS REFERENCE

This application is a National Stage Filing of the PCT International Application No. PCT/CN2020/121947 filed on Oct. 19, 2020, which claims priority to Chinese Application No. 201911072282.5 filed on Nov. 5, 2019, the entirety of which is herein incorporated by reference.

TECHNICAL FIELD

The present disclosure relates to the field of network communication, and in particular to a method and apparatus for processing a deterministic networking (DetNet) data packet.

BACKGROUND

When deterministic service flows are running on a multiprotocol label switching (MPLS) packet switched network, a data plane of the deterministic service flows is specified by an Internet engineering task force (IETF) draft, DetNet Data Plane: MPLS draft-internet engineering task force (ietf)-detnet-mpls-01.

The DetNet Architecture models the DetNet related data plane functions decomposed into two sub-layers: a service sub-layer and a forwarding sub-layer. The service sub-layer is used to provide DetNet service functions such as protection and reordering, and includes a DetNet control word (d-CW) and an identification service label (S-Label). The forwarding sub-layer is used to provide forwarding assurance (low loss, guaranteed delay, and limited reordering). The IETF draft specifies the DetNet data plane operation and the on-wire encapsulation of DetNet service flows over an MPLS-based Packet Switched Network (PSN) using the service sub-layer reference model.

Figure 1:
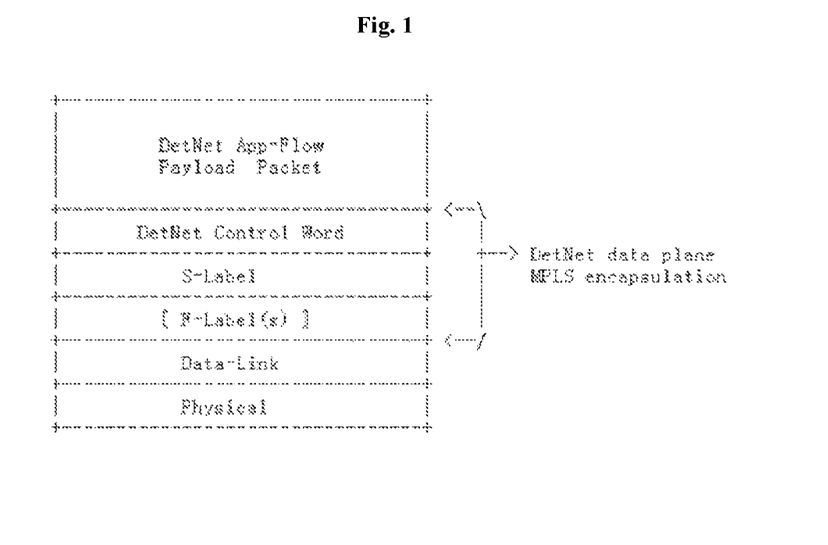
FIG. 1 shows an MPLS encapsulation format of DetNet in an IETF draft.
Figure 2:
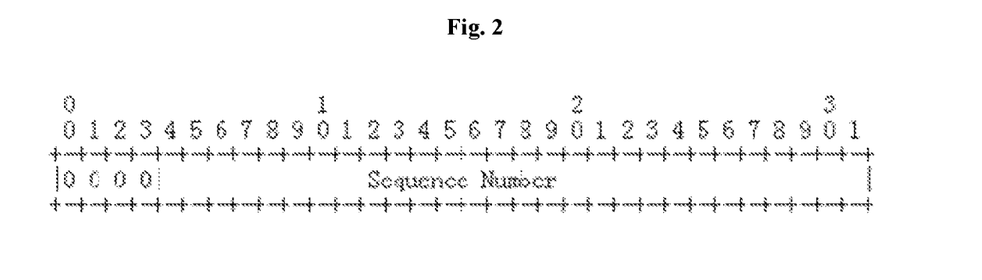
FIG. 2 shows a format of a DetNet control word in the IETF draft.

The MPLS encapsulation format of DetNet is shown in FIG. 1, where the DetNet control word includes a sequence number, which is used for data packet duplication and duplicate elimination purpose, and is additionally used for an operation administration and maintenance (OAM) indicator. The format of the DetNet control word is shown in FIG. 2. The first 4 bits are set to 0, and the last 28 bits are used to carry a sequence number. The application flow identification of the DetNet service sub-layer is implemented by means of an S-Label. For the MPLS-aware DetNet end system and edge node (defined as MPLS ingress and egress nodes), the application flow specific d-CW and S-Label need to be added and deleted. When processing application flows, the relay nodes can swap S-Label. An S-Label needs to be provisioned per application flow via configuration (e.g., via configuration of the control plane). Note that S-Labels provide application flow identification at the downstream DetNet service sub-layer receiver, not the sender. As such, S-Labels needs to be allocated by the entity that controls a label space of the service sub-layer receiving node, and may be allocated from a platform label space. Because S-Labels are local to each node rather than being a global identifier within a domain, the S-Labels need to be advertised to their upstream DetNet service-aware peer nodes (e.g., a DetNet MPLS End System or a DetNet Relay or Edge Node).

The allocation process and the notification process of the S-Label are complex, and each message needs to be analyzed and matched to determine whether the message is an MPLS encapsulated DetNet application flow when the packet reaches the DetNet node device, resulting in long time consumption and low efficiency.

SUMMARY

Embodiments of the present disclosure provide a method and apparatus for processing a DetNet data packet, which can at least solve the problem that in the related art, each message needs to be analyzed and matched to determine whether the message is an MPLS encapsulated DetNet application flow when the DetNet application flow reaches a DetNet node device, resulting in long time consumption and low efficiency.

According to some embodiments of the present disclosure, provided is a method for processing a DetNet data packet, including: performing, by a DetNet node, format encapsulation on a data packet of a DetNet application flow when the DetNet application flow passes through an MPLS network, where an encapsulated data packet comprises a label indication and a flow identifier header; and forwarding the encapsulated data packet in the MPLS network.

According to some embodiments of the present disclosure, further provided is a method for processing a DetNet data packet, including: receiving a data packet of a DetNet application flow; determining whether the data packet is in an MPLS encapsulation format of DetNet according to a label value of a label indication in the data packet, where the data packet includes the label indication and a flow identifier header; and analyzing and processing the data packer in a case where the data packet is in the MPLS encapsulation format of DetNet.

According to some embodiments of the present disclosure, further provided is a storage medium, storing a computer program, where the computer program is configured to execute the operations of any one of the above method embodiments at runtime.

According to some embodiments of the present disclosure, further provided is an electronic apparatus, including a memory and a processor, where the memory stores a computer program, and the processor is configured to run the computer program to execute the operations of any one of the above method embodiments.

BRIEF DESCRIPTION OF THE DRAWINGS

The accompanying drawings described herein serve to provide a further understanding of the present disclosure and form a part of the disclosure, and the exemplary embodiments of the present disclosure and the description of the exemplary embodiments serve to explain the present disclosure and are not to be construed as unduly limiting the present disclosure. In the drawings.

DETAILED DESCRIPTION

The present disclosure will be described in detail below with reference to the accompanying drawings in conjunction with embodiments. It should be noted that the embodiments of the disclosure and the features of the embodiments may be combined with each other without conflict.

It should be noted that the terms "first", "second", etc., in the description and claims of the present disclosure and in the above drawings, are used to distinguish between similar objects and not necessarily to describe a particular order or sequential order.

Figure 3:
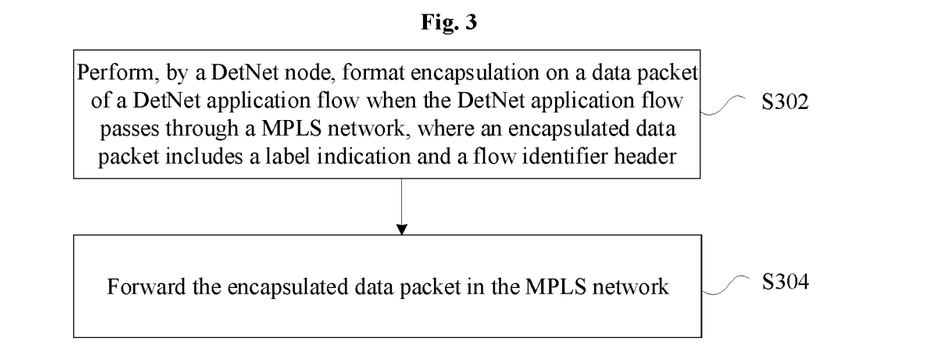
FIG. 3 is a flow chart of a method for processing a DetNet data packet according to some embodiments of the present disclosure.

Provided in some embodiments is a method for processing a DetNet data packet. FIG. 3 is a flow chart of the method according to some embodiments of the present disclosure. As shown in FIG. 3, the flow includes the following operations.

At S302, a DetNet node performs format encapsulation on a data packet of a DetNet application flow when the DetNet application flow passes through a MPLS network, where an encapsulated data packet includes a label indication and a flow identifier header.

At S304, the encapsulated data packet is forwarded in the MPLS network.

Figure 4A:
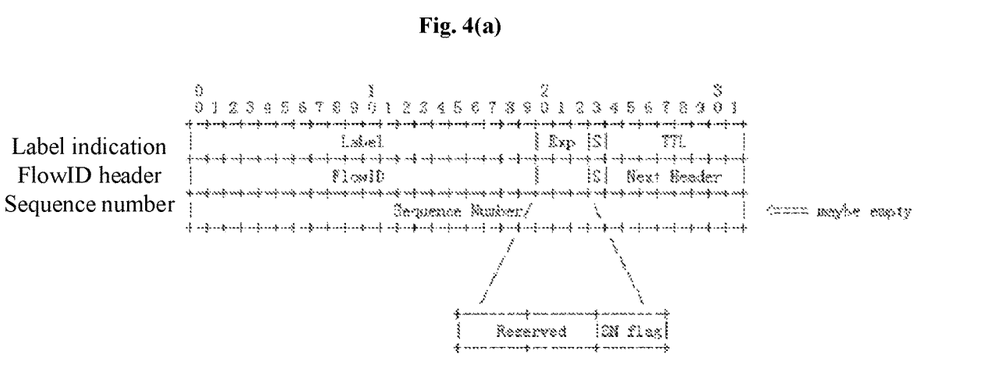
FIG. 4 shows an MPLS encapsulation format of DetNet according to some embodiments of the present disclosure.
Figure 4B:
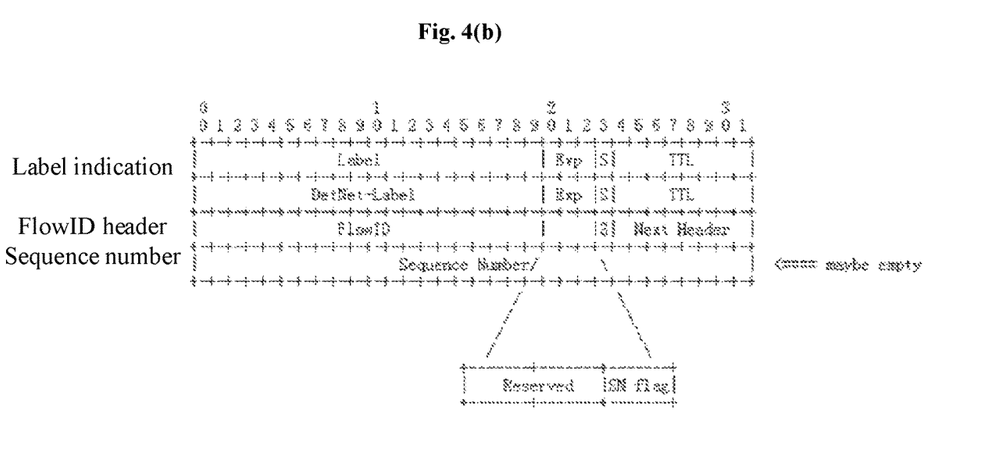
Figure 5:
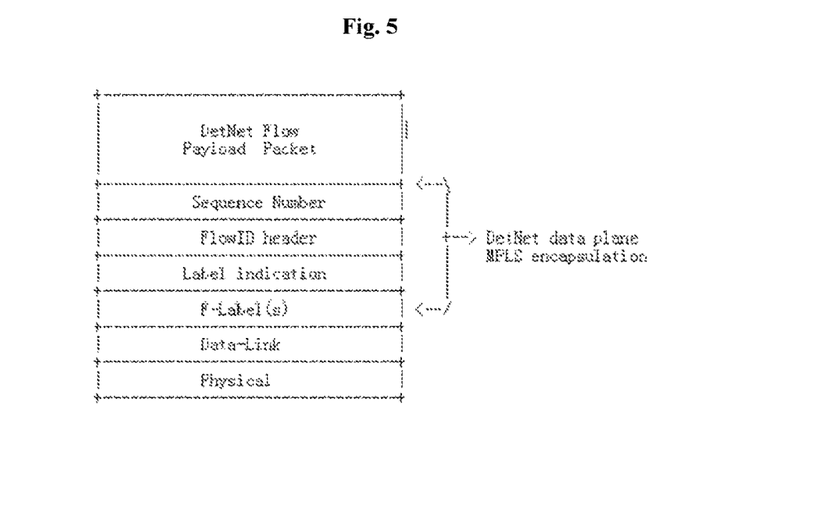
FIG. 5 shows a message encapsulation format according to some embodiments of the present disclosure.
Figure 6:
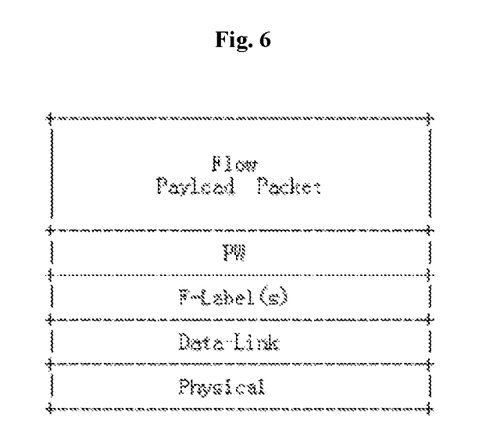
FIG. 6 shows a layer 2 virtual private network (L2VPN) message encapsulation format according to some embodiments of the present disclosure.
Figure 7:
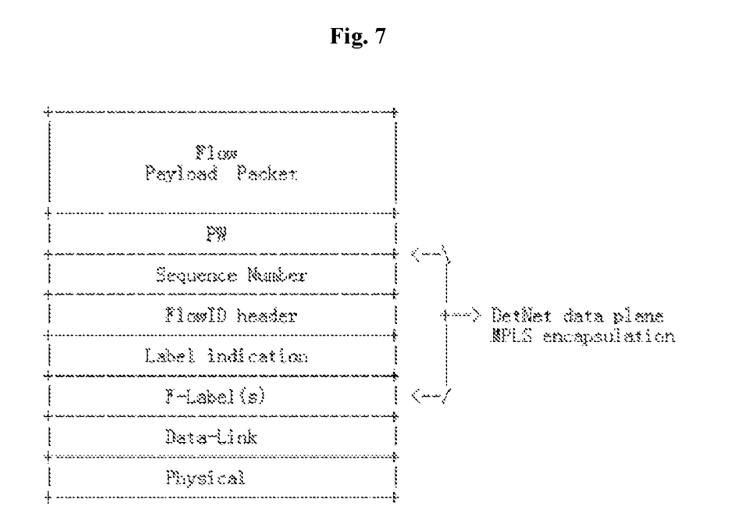
FIG. 7 shows an L2VPN message encapsulation format according to some other embodiments of the present disclosure.

Provided in some embodiments is an MPLS-based DetNet data plane encapsulation. An encapsulation format of the MPLS-based DetNet data plane encapsulation is shown in FIGS. 4a and 4b. There are two encapsulation formats, consisting of three parts: a label indication, a flow identifier (FlowID) header (or called as an instruction header), and a sequence number. The label indication and the FlowID header are compulsory, and the sequence number is optional. The new encapsulation format replaces two fields DetNet control word (d-CW) and service label (S-Label) in FIG. 1, and an overall encapsulation format after replacement is shown in FIG. 5. In addition, there is special layer 2 virtual private network (L2VPN) data whose encapsulation format is shown in FIG. 6, a new encapsulation label is inserted into the encapsulation format of the L2VPN data, and an overall encapsulation format after replacement is shown in FIG. 7.

In the DetNet data plane encapsulation format of the embodiments, the label indication is a standard MPLS label stack code, which takes label values (0-15) reserved for MPLS. The first 20 bits are used for carrying a label value, and values 0-3, 7, and 13-15 have been used, where value 15 is extensible. The last 3 experimental (Exp) bits are reserved bits. An S-bit indicates whether the label is at the bottom of the stack, where the S-bit taking the value of 1 indicates that the label is at the bottom of the stack, and the S-bit taking the value of 0 indicates other label stack entries. A Time to live (TTL) field occupies 8 bits. The format conforms to the RFC 3032 standard. Additionally, this label indication may further be a system-designated specific value, and may not be within the range of 0-15.

In the DetNet data plane encapsulation format of the embodiments, the first 20 bits of the FlowID header are used for carrying a FlowID, i.e., an S-Label value. The last bit in the following 3 reserved bits is used for carrying a sequence number (SN) flag which indicates whether there is a sequence number, where the SN flag taking the value of 0 indicates that there is a sequence number, the SN flag taking the value of 1 indicates that there is no sequence number, and the default value for the SN flag is 1. The first two bits in the 3 reserved bits are still reserved. Next Header occupies 8 bits, and indicates an encapsulation type after the sequence number, where the Next Header being 0 indicates no subsequent encapsulation, the Next Header being 1 indicates there is OAM data, and the Next Header being 2 indicates there is pseudo wire (PW) encapsulation.

In the DetNet data plane encapsulation format of the embodiments, the sequence number field occupies 32 bits and is used for carrying the sequence number used for data packet duplication and duplicate elimination purpose.

In the DetNet data plane encapsulation format of the embodiments, the label indication may have two formats which are respectively described as follows.

Figure 8:
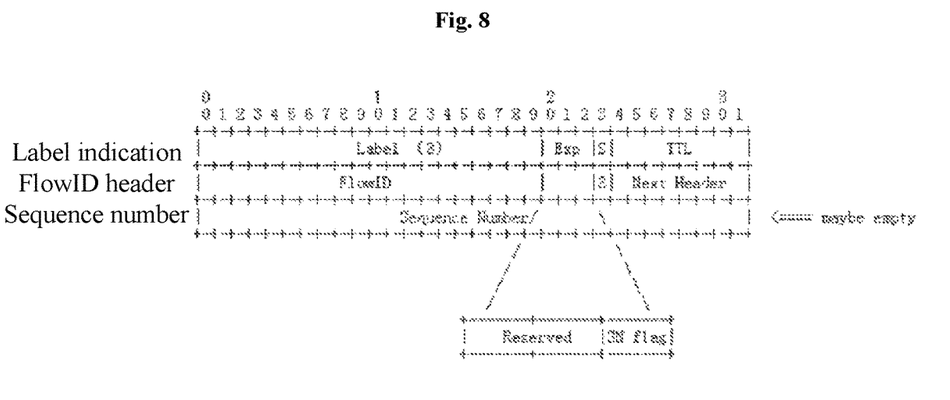
FIG. 8 shows an encapsulation format using a Label value of 8 according to some embodiments of the present disclosure.

One format for the label indication is that the label value may apply for a value that is not one of the reserved values, e.g., a value of 8, and an encapsulation format of the label indication is shown in FIG. 8.

Figure 9:
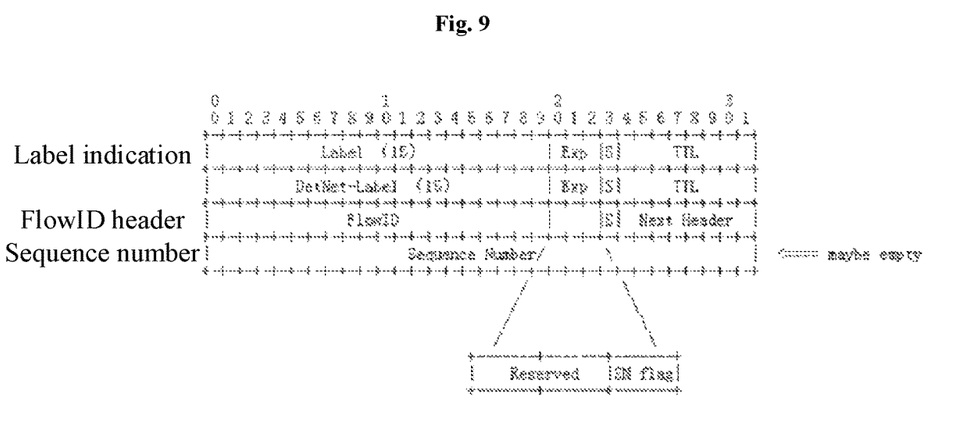
FIG. 9 shows an encapsulation format using an extended label value of 15 according to some embodiments of the present disclosure.

The other format for the label indication is that the label value takes an extended label value of 15, indicating that data after the label indication is extensible, a new label indication is inserted after the label indication, and in the new label indication, only a DetNet-Label value is used, a new default value, e.g., 15, is allocated, and the rest fields in the new label indication is set to fixed values or 1 (not used in practice). The extended label indication indicates that this encapsulation is an MPLS encapsulation of DetNet. The new DetNet-Label field is still followed by the FlowID header and the sequence number, and an encapsulation format of the label indication is shown in FIG. 9.

According to a new message encapsulation format provided in some embodiments, when a message arrives at a DetNet device, it is only needed to analyze whether the Label in the label indication is 8 or 15 to determine whether the message is in MPLS encapsulation of DetNet. If the Label is 15, it is further determined whether the DetNet-Label value is 15. After identifying the label indication, the sequence number and the S-label are parsed, and identification complexity is greatly simplified.

Figure 10:
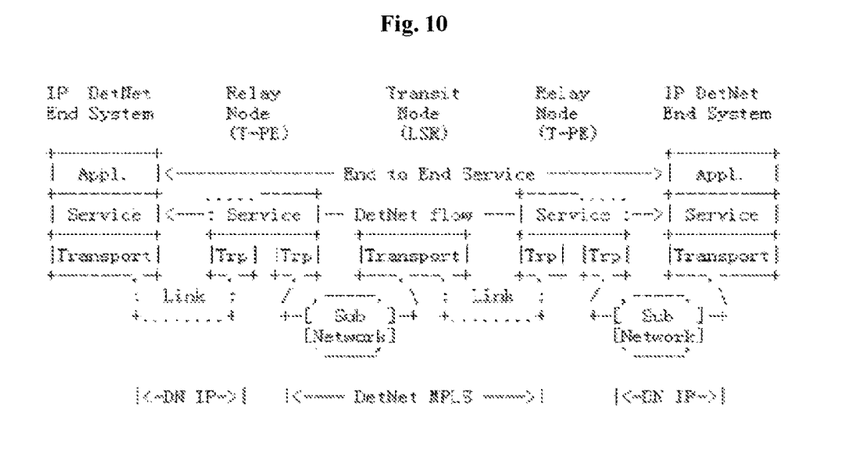
FIG. 10 is a schematic diagram of an MPLS network of DetNet according to some embodiments of the present disclosure.

As shown in FIG. 10, in a case where a DetNet application flow passes through an MPLS network, a service layer of each node identifies and forwards the DetNet application flow, and the application flow starts from an Internet protocol (IP) DetNet terminal on a left side, passes through the DetNet MPLS network and reaches an IP DetNet terminal on a right side. The service layer of each node performs DetNet-related encapsulation and operation. The involved nodes include an ingress node of an edge node, an egress node of the edge node and an intermediate forwarding node, and the three types of nodes are introduced in detail as follows.

Figure 11:
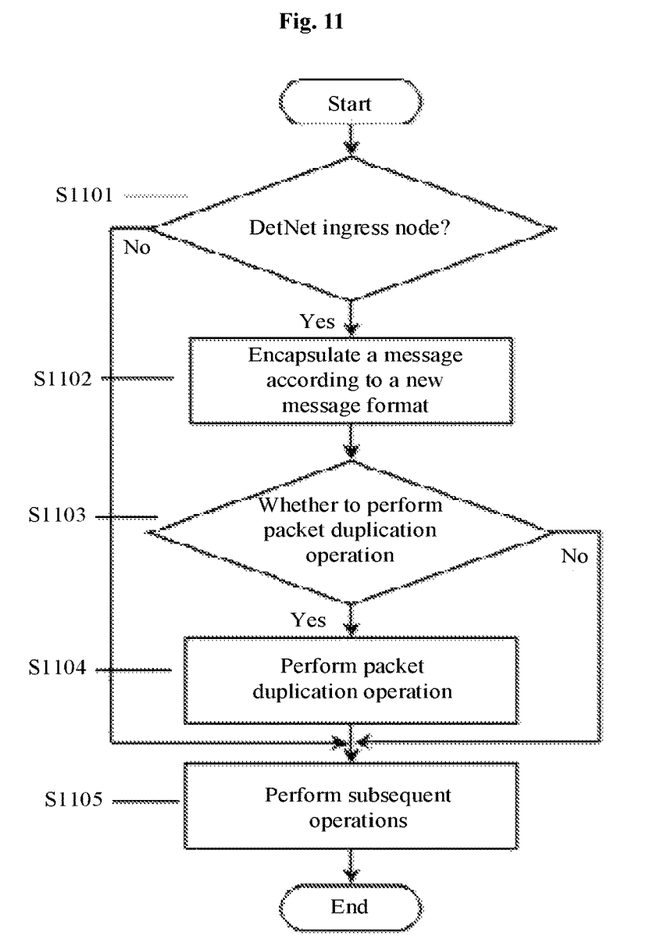
FIG. 11 is a processing flow chart of an edge ingress node at a service layer according to some embodiments of the present disclosure.

1) The IP DetNet terminal on the left side is the ingress node of the edge node, and the service layer in the IP DetNet terminal encapsulates a message, including generation of the FlowID and the sequence number and encapsulation according to the encapsulation format described in the above embodiments. As shown in FIG. 11, the processing operations are as follows.

At S1101, whether a current node is a DetNet ingress node is determined, in a case where the current node is a DetNet ingress node, continue processing, and otherwise, proceed to S1105.

At S1102, a FlowID and a sequence number are generated, and a message is encapsulated according to the encapsulation format described in the above embodiments.

At S1103, whether to perform packet duplication operation is determined, in a case of determining to perform packet duplication operation, continue processing, and otherwise, proceed to S1105.

At S1104, packet duplication operation is performed according to the FlowID and the sequence number.

At S1105, subsequent function operations are performed.

Figure 12:
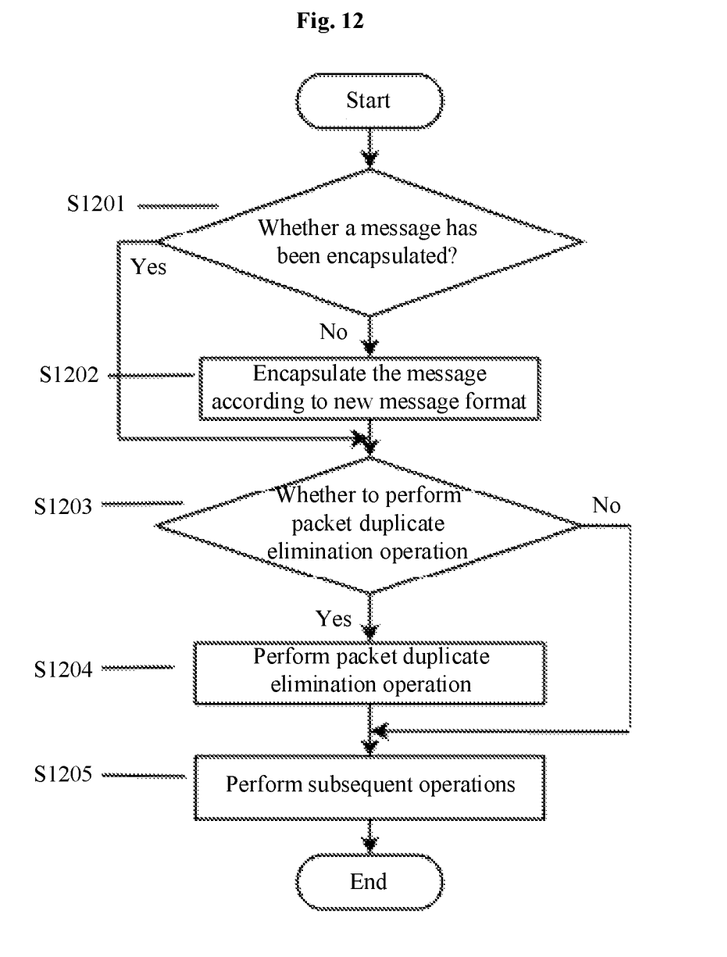
FIG. 12 is a processing flow chart of an intermediate node at a service layer according to some embodiments of the present disclosure.

2) An intermediate network node performs a series of function operations of message forwarding, packet duplicate elimination, etc. according to the analyzed FlowID and sequence number, and the FlowID may be changed or not changed in a forwarding process. As shown in FIG. 12, the processing operations are as follows.

At S1201, whether the message is subjected to MPLS encapsulation of DetNet is determined, in a case of determining that the message is subjected to the MPLS encapsulation of DetNet, proceed to S1203, and otherwise, continue processing.

At S1202, a FlowID and a sequence number are generated, and the message is encapsulated according to the encapsulation format of the above embodiments.

At S1203, whether to perform packet duplication and elimination operation is determined, in a case of determining to perform packet duplication and elimination operation, continue processing, and otherwise, proceed to S1205.

At S1204, packet duplication and elimination operations are performed according to the FlowID and the sequence number.

At S1205, subsequent function operations are performed.

Figure 13:
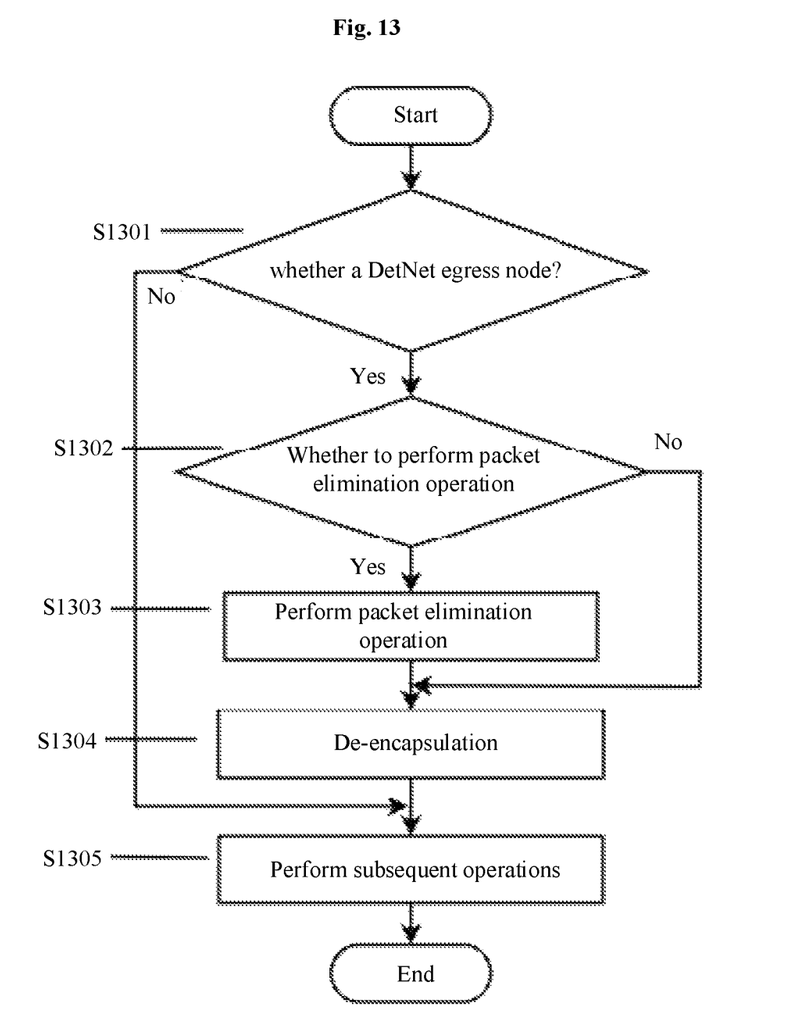
FIG. 13 is a processing flow chart of an edge egress node at a service layer according to some embodiments of the present disclosure.

3) The IP DetNet terminal on the right side is an egress node of the edge node, and the service layer in the IP DetNet terminal de-capsulates the message. As shown in FIG. 13, the processing operations are as follows.

At S1301, whether a current node is a DetNet egress node is determined, in a case where the current node is a DetNet egress node, continue processing, and otherwise, proceed to S1305.

At S1302, whether to perform a packet duplicate elimination operation is determined, in a case of determining to perform the packet duplicate elimination operation, continue processing, and otherwise, proceed to S1304.

At S1303, packet duplicate elimination is performed according to the FlowID and the sequence number.

At S1304, the message is de-encapsulated.

At S1305, subsequent function operations are performed.

In the above embodiments of the present disclosure, the label indication is effectively utilized, thereby greatly simplifying identification complexity of the MPLS encapsulation of the DetNet message.

To facilitate understanding of the technical solutions provided in the embodiments of the present disclosure, the embodiments of the present disclosure will be described in detail below with reference to exemplary application scenario.

Embodiment 1

In the embodiment, the label indication uses a first mode and there is a sequence number.

Figure 14:
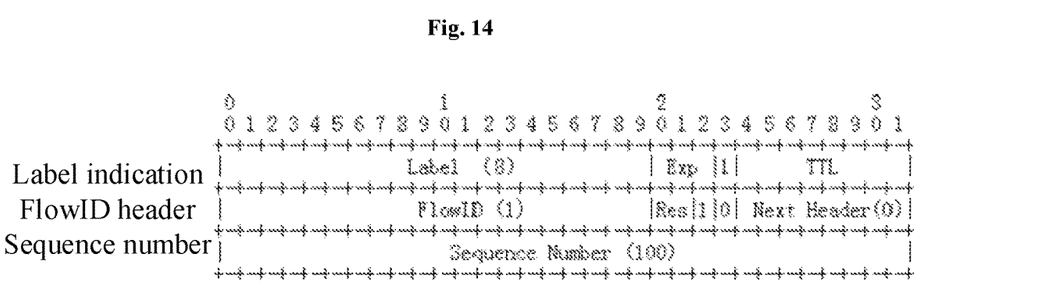
FIG. 14 is a schematic diagram of a DetNet data packet encapsulation format according to embodiment 1 of the present disclosure.

An encapsulation format of the DetNet data packet is shown in FIG. 14. It is assumed that a DetNet flow has a source address of 10.1.1.1, a destination address of 10.2.2.1, a Label value of 8, an Exp value of 1 after FlowID, and a Next Header value of 0, and a FlowID and a sequence number generated by the application are respectively 1 and 100. When a DetNet device node receives an application flow data packet, whether the Label value is 8 is determined, in a case where the Label value is 8, it is determined that the application flow data packet is in the MPLS encapsulation format of DetNet, and subsequent processing is performed based on the analyzed FlowID and sequence number.

Embodiment 2

In some embodiments, the label indication uses a first mode, and there is no sequence number.

Figure 15:
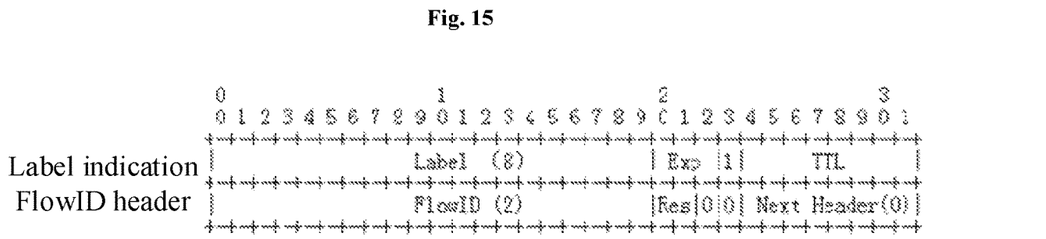
FIG. 15 is a schematic diagram of a DetNet data packet encapsulation format according to embodiment 2 of the present disclosure.

An encapsulation format of the DetNet data packet is shown in FIG. 15. It is assumed that a DetNet flow has a source address of 10.1.1.2, a destination address of 10.2.2.2, a Label value of 8, an Exp value of 0 after FlowID, and a Next Header value of 0, and a FlowID generated by the application is 2. When a DetNet device node receives an application flow data packet, whether the Label value is 8 is determined, in a case where the Label value is 8, it is determined that the application flow data packet is in the MPLS encapsulation format of DetNet, and subsequent processing is performed based on the analyzed FlowID.

Embodiment 3

In some embodiments, the label indication uses a second mode, and there is a sequence number.

Figure 16:
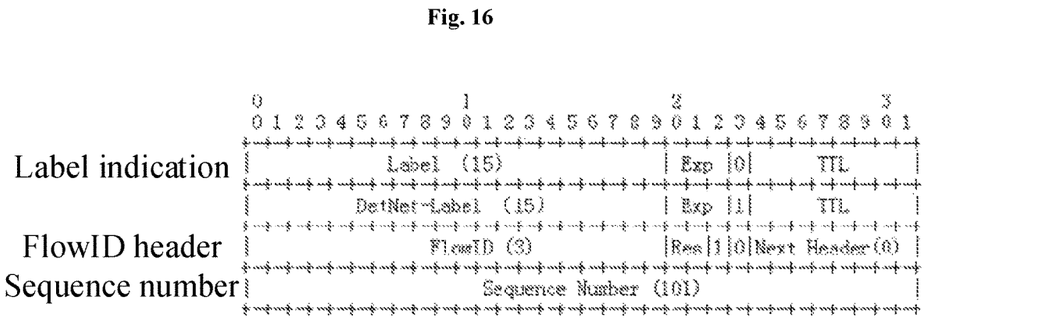
FIG. 16 is a schematic diagram of a DetNet data packet encapsulation format according to embodiment 3 of the present disclosure.

An encapsulation format of the DetNet data packet is shown in FIG. 16. It is assumed that a DetNet flow has a source address of 10.1.1.3, a destination address of 10.2.2.3, a Label value of 15, an Exp value of 1 after FlowID, a DetNet-Label value of 15, and a Next Header value of 0, and a FlowID and a sequence number generated by the application are respectively 3 and 101. When a DetNet device node receives an application flow data packet, whether the Label value is 15 is determined, in a case where the Label value is 15, whether the DetNet-Label value is 15 is further determined, in a case where the DetNet-Label value is 15, it is determined that the application flow data packet is in an MPLS encapsulation format of DetNet, and subsequent processing is performed based on the analyzed FlowID and sequence number.

Embodiment 4

In some embodiments, the label indication uses a second mode, there is a sequence number, and there is encapsulation data after the sequence number.

Figure 17:
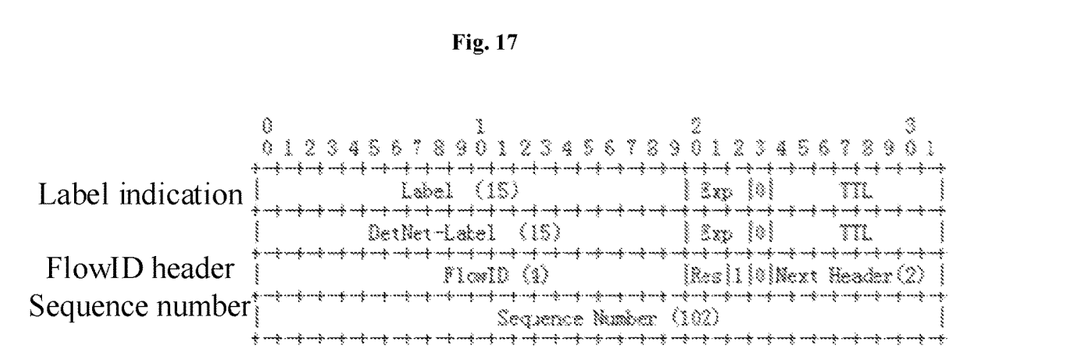
FIG. 17 is a schematic diagram of a DetNet data packet encapsulation format according to embodiment 4 of the present disclosure.

An encapsulation format of the DetNet data packet is shown in FIG. 17. It is assumed that a DetNet flow has a source address of 10.1.1.4, a destination address of 10.2.2.4, a Label value of 16, an Exp value of 1 after FlowID, a DetNet-Label value of 15, a Next Header value of 0, and subsequent encapsulation of PW, and a FlowID and a sequence number generated by the application are respectively 4 and 102. When a DetNet device node receives an application flow data packet, whether the Label value is 15 is determined, in a case where the Label value is 15, whether the DetNet-Label value is 15 is further determined, in a case where the DetNet-Label value is 15, it is determined that the application flow data packet is in an MPLS encapsulation format of DetNet, and subsequent processing is performed based on the analyzed FlowID and sequence number.

From the description of the above implementation modes, it will be apparent to those having ordinary skill in the art that the methods according to the above embodiments may be implemented by means of software plus a necessary general-purpose hardware platform, and of course may also be implemented by means of hardware, but in many cases the former is a better implementation mode. On the basis of the understanding, the essence of the technical solution of the embodiments of the present disclosure or the part of the technical solution of the embodiments of the present disclosure contributing to the prior art may be embodied in a form of a software product, and the computer software product is stored in a storage medium (such as a read only memory (ROM)/random access memory (RAM), a magnetic disk and an optical disk), and includes several instructions for enabling a terminal device (such as a mobile phone, a computer, a server or a network device) to execute the method of each embodiment of the present disclosure.

The embodiments of the present disclosure also provide a storage medium, storing a computer program, where the computer program is configured to execute the operations of any one of the above method embodiments at runtime.

In the embodiments, the above storage medium may include, but not limited to, a USB flash drive, a ROM, a RAM, a mobile hard disk, a magnetic disk, an optical disk, and other media that may store computer programs.

The embodiments of the present disclosure also provide an electronic apparatus, including a memory and a processor, where the memory stores a computer program, and the processor is configured to run the computer program to execute the operations of any one of the above method embodiments.

Optionally, the above electronic apparatus may further include a transmission device and an input/output device, where the transmission device is connected to the above processor and the input/output device is connected to the above processor.

By means of the embodiments of the present disclosure, the label indication is added into the MPLS encapsulation, and the d-CW and the S-Label in the original encapsulation format are changed, thereby simplifying label identification, such that the sending can be performed directly after the application generates the sequence number and the S-Label, and the relay node does not need to change and swap the S-Label, thereby shortening forwarding time and improving forwarding efficiency.

Obviously, those having ordinary skill in the art will appreciate that the modules or operations of the present disclosure above may be implemented with a general-purpose computation apparatus, and may be centralized on a single computation apparatus or distributed on a network composed of a plurality of computation apparatuses, optionally, they may be implemented with program codes executable by the computation apparatus, such that they may be stored in a storage apparatus to be executed by the computation apparatus, and under some conditions, the operations shown or described may be executed in an order different from that herein, or they may be fabricated separately as individual integrated circuit modules, or multiple modules or operations of them may be fabricated as a single integrated circuit module for achievement. Thus, the present disclosure is not limited to any combination of particular hardware and software.

What is described above is merely the exemplary embodiments of the present disclosure and is not intended to limit the present disclosure, and for those having ordinary skill in the art, various modifications and changes may be made for the present disclosure. Any modifications, equivalent substitutions, improvements, etc. within the principle of the present disclosure shall fall within the scope of protection of the present disclosure.

What is claimed is:

1. A method for processing a deterministic networking (DetNet) data packet, comprising:
    performing, by a DetNet node, format encapsulation on a data packet of a DetNet application flow when the DetNet application flow passes through a multiprotocol label switching (MPLS) network, wherein an encapsulated data packet sequentially comprises a label indication and a flow identifier header;
    in a case where a label value of the label indication is an extended label value, inserting an extended label indication between the label indication and the flow identifier header, wherein a DetNet-Label value in the extended label indication indicates whether the data packet is in an MPLS encapsulation format of DetNet, and the flow identifier header is used for data packet duplication and duplicate elimination purpose; and
    forwarding the encapsulated data packet in the MPLS network.

2. The method according to claim 1, wherein the encapsulated data packet further comprises a sequence number.

3. The method according to claim 2, wherein the label indication, the flow identifier header and the sequence number replace fields DetNet control word (d-CW) and service label (S-Label).

4. The method according to claim 2, wherein the sequence number occupies 32 bits and is used for data packet duplication and duplicate elimination purpose.

5. The method according to claim 1, wherein the label indication is a standard MPLS label stack code, and sequentially comprises a label value with a length of 20 bits, experimental (Exp) reserved bits with a length of 3 bits, an S bit with a length of 1 bit for indicating whether the label is at a bottom of a stack, and time to live (TTL) with a length of 8 bits.

6. The method according to claim 1, wherein the flow identifier header sequentially comprises a flow identifier (FlowID) with a length of 20 bits, a reserved value with a length of 3 bits, an S bit with a length of 1 bit for indicating whether the label is at a bottom of a stack, and a Next Header with a length of 8 bits, wherein a last bit of the reserved value is a sequence number (SN) flag for indicating whether there is a sequence number, and the Next Header is used for indicating an encapsulation type after the sequence number.

7. The method according to claim 1, wherein the label value of the label indication being the extended label value indicates that data after the label indication is extensible, wherein in the extended label indication, only the DetNet-Label in the extended label indication is used and a new default value is allocated to the DetNet-Label.

8. A non-transitory computer-readable storage medium, storing a computer program, wherein the computer program is configured to execute the method according to claim 1 at runtime.

9. An electronic apparatus, comprising a memory and a processor, wherein the memory stores a computer program, and the processor is configured to run the computer program to execute the method according to claim 1.

10. The method according to claim 1, wherein the label indication and the flow identifier header replace fields DetNet control word (d-CW) and service label (S-Label).

11. A method for processing a deterministic networking (DetNet) data packet, comprising:
    receiving a data packet of a DetNet application flow;
    in a case where a label value of a label indication in the data packet is an extended label value, determining that data after the label indication is extensible, and an extended label indication is inserted between the label indication and a flow identifier header in the data packet, wherein in the extended label indication, only a DetNet-Label in the extended label indication is used and a new default value is allocated to the DetNet-Label;
    determining whether the DetNet-Label value in the extended label indication is a conventional default value; and in a case where the DetNet-Label value in the extended label indication is the conventional default value, determining that the data packet is in an MPLS encapsulation format of DetNet, and analyzing and processing the data packet, wherein the data packet sequentially comprises the label indication and the flow identifier header, and the flow identifier header is used for data packet duplication and duplicate elimination purpose.

12. The method according to claim 11, wherein the data packet further comprises a sequence number.

13. The method according to claim 11, wherein the label indication is a standard MPLS label stack code, and sequentially comprises a label value with a length of 20 bits, experimental (Exp) reserved bits with a length of 3 bits, an S bit with a length of 1 bit for indicating whether the label is at a bottom of a stack, and time to live (TTL) with a length of 8 bits.

14. The method according to claim 11, wherein after receiving the data packet of the DetNet application flow, the method further comprises:
    determining whether the label value of the label indication is a conventional value, wherein the conventional value is a value that is not one of the reserved values; and
    in a case where the label value of the label indication is the conventional value, determining that the data packet is in the MPLS encapsulation format of DetNet.

15. A non-transitory computer-readable storage medium, storing a computer program, wherein the computer program is configured to execute the method according to claim 11 at runtime.

16. An electronic apparatus, comprising a memory and a processor, wherein the memory stores a computer program, and the processor is configured to run the computer program to execute the method according to claim 11.

* * * * *